: 3,502,638
Patented Mar. 24, 1970

3,502,638
PROCESS FOR REMOVING IMPURITIES FROM CIRCULATING GASES IN THE HIGH-PRESSURE POLYMERIZATION OF ETHYLENE
Manfred Rätzsch and Horst Grundmann, Leuna, and Rolf Kilian, Bad Dürrenberg, Germany, assignors to VEB Leuna-Werke Walter Ulbricht, Leuna, Germany
No Drawing. Filed Dec. 22, 1965, Ser. No. 515,712
Int. Cl. C08f *1/88, 1/96, 1/06*
U.S. Cl. 260—94.9        8 Claims

ABSTRACT OF THE DISCLOSURE

Impurities are removed from the recycle gas stream in the high pressure polymerization or copolymerization of ethylene by passing the gas through a layer of generator slag, coke or pumice.

---

The invention relates to a method for removing by use of adsorbents, undesired impurities from the gases circulating through the system for high pressure polymerization of ethylene or mixtures of ethylene with other polymerizable compounds, after separation of the high molecular polymer formed has taken place. In the circulating system pressures between 50 and 800 atm. and temperatures between 10 and 80° C. are prevailing.

These impurities are composed primarily from polyethylene, or ethylene copolymers of low molecular weights, so-called mashes, also entrained compressor lubricants, as well as other byproducts which are formed during the polymerization.

The complete separation of the above-named impurities from the gases in the circulating system after the separation of the high molecular materials is necessary for various reasons. The impurities pollute the pipes, containers, measuring and analysis instruments, as well as the high pressure compressors. Furthermore, they will be passed again into the reactor together with the fresh ethylene, and will obstruct the polymerization reaction and cause the impairment of the quality of the resulting polymer.

Finally, the ethylene which is continuously released in order to lower the pressure of inert gas in the circulating system could not be used without purification for making secondary products, e.g. ethyl benzene, ethylene oxide or synthetic lubricants, with the above mentioned impurities present.

It is known that circulating gas can be purified at pressures between 50 and 500 atm. and temperatures between 200 and minus 20° C. by passing it through a plurality of serially arranged cooling and separating devices after the high molecular polyethylene has been separated from the gas. However, in this way it is impossible to achieve a complete separation of undesirable components, so that the method can only be used for a coarse purification of the circulating gas.

It is also known to free the circulating gas from low molecular admixtures, particularly from byproducts of the high pressure polymerization of ethylene, or of mixtures of ethylene and other polymerizable monomers, by treating the circulating gaseous materials, which primarily consist of unreacted ethylene, with active carbon, silica gel, alumina, alumina oxides and/or molecular sieves, if necessary after the above described coarse purification, the treatment taking place at pressures between 50 and 700 atm. and temperatures between 10 and 50° C. The purification of the above-named adsorbents is effected by passing over of gases, e.g., nitrogen or ethylene, at temperatures above 180° C. and at a normal or slightly increased pressure.

This method has various shortcomings. The adsorbents, such as active carbon, silica gel or the molecular sieves are overstrained by the hot gases passing over them and will, therefore, soon become ineffective. The passage of the hot gases requires also additional heating devices and, in the case of ethylene, additional safety measures to avoid the danger of explosion of the ethylene-air mixtures.

A further disadvantage of the method consists therein that the adsorbents mentioned are rather sensitive against larger pressure fluctuations, which lead to their disintegration. The resulting powder-like products cause clogging of the adsorption devices.

Finally, a method for cleaning of polymerizable olefin hydrocarbons with 2 to 4 carbon atoms is known, wherein the olefins are treated with mineral adsorbents, by passing the olefins through an adsorptive layer of aluminum oxide and/or iron oxide, and, if necessary, silicic acid, at temperatures from 50 to 200° C.

This method requires a lot of energy since the adsorption layer while in operation must be continuously maintained at the required temperature. It is a further disadvantage that a catalytic effect of the aluminum or iron oxide takes place if the conditions of the process according to the invention are used; this would result in a polymerization of part of the olefin, leading to the formation of additional low molecular products.

It is an object of the invention to eliminate the above-stated shortcomings of the known processes, providing a method which permits to use adsorbents for the circulating gases which are easily available, which are unaffected by pressure and temperature fluctuations, which can be easily regenerated, and with which it is possible to achieve a complete separation of the undesirable impurities in one operating step.

This object will be achieved according to the invention by passing the gases circulating through the system for high pressure polymerization of ethylene or mixtures of ethylene with other polymerizable compounds at temperatures ranging from 10° C. to 80° C., and pressures between 50 and 800 atm., after separation of the high molecular polymer formed and before re-circulation of said gases through the polymerization system, through a layer of porous materials, which may be sintered or foamed; such materials including, for instance, generator slag, coke, pumice and sintered metals.

The porous materials will be used preferably in granules of 3 to 100 mm., more particularly 10 to 30 mm. After exhaustion of the adsorptive capacity of the adsorbents used in accordance with the invention, pressure in the adsorbent plant will be reduced. The adsorbents will be freed from the impurities adsorbed from the circulating gases by washing with steam, if necessary after having been rinsed with nitrogen; subsequently they are dried.

The inventive method permits a complete cleaning of the circulating gases in the shortest time possible. Moreover, the regeneration of the exhausted materials is possible without high expenses. In addition thereto, the necessary adsorbents are readily available and some of them are even waste products.

In the following, the invention will be more fully described in a number of examples, but it should be understood that these are given by way of illustration and not of limitation and that many changes of details can be made without departing from the spirit of the invention.

Example 1

5000 kg. ethylene are hourly passed through an adsorption tower having an inner diameter of 40 cm. and a height of 800 cm. at a temperature of 40° C. and a pressure of 240 atm. The tower was filled with generator slag which had a granule size of 10 to 30 mm. The ethylene came from the circulating system of the high pressure polymerization and was contaminated with compressor lubricants, liquid and mash-like low molecular ethylene polymers and other undesirable components. For the purpose of regeneration of the exhausted generator slag, the operation was switched over after 72 hours to a parallel tower which was charged with the same adsorbent mass.

The regeneration of the generator slag in the first tower was effected after eliminating the ethylene by pressure reduction and subsequent nitrogen rinsing, by blowing with low pressure steam for three hours. Thereafter, the adsorbent material was dried by blowing with nitrogen. The nitrogen was not preheated since the heat content of the tower and of the generator slag was sufficient for drying. After a rinsing with ethylene, the tower was ready for another operation. When adsorption had taken place during the stated operating time, no more impurities could be found in the circulating system. Tests before the regeneration of the used generator slag showed a weight increase of 7.5% due to the adsorbed impurities from the circulating system. A further test of the weight of the generator slag after the regeneration showed that the impurities were completely removed therefrom.

120 regenerations per charge were conducted. A weakening of the adsorptive capacity or a lessening of the mechanical strength of the generator slag could not be noted.

Example 2

5,000 kg. ethylene are hourly passed at a temperature of 45° C. and at a pressure of 250 atm. through the adsorption tower described in Example 1. The tower was filled with lignite coke with a granule size of 5 to 20 mm. The ethylene contained the same impurities as described in Example 1. For the purpose of regeneration of the lignite coke, the operation was switched over after 30 hours operating time to a parallel tower which was filled with the same material. During the stated operating time no impurities could be found in the circulating system. Tests before the regeneration of the used lignite coke showed a weight increase of 9% due to the adsorbed impurities from the circulating system. A further test of the weight of the lignite coke after the regeneration showed that all impurities were removed therefrom.

90 regenerations of the lignite coke were conducted. A weakening of the adsorptive capacity and a lessening of the mechanical strength of the lignite coke could not be found.

Example 3

4,500 kg. ethylene at a temperature of 47° C. and a pressure of 250 atm. were passed hourly through the adsorption tower as described in Example 1. The tower was filled with pumice which had a granule size of 60 to 80 mm. The ethylene contained the same impurities as described in Example 1. For the purpose of regeneration of the exhausted pumice the operation was switched over after 35 hours to a parallel tower which was filled with the same mass and was treated in the same manner as described in Example 1.

During the above stated operating time no impurities of the ethylene which is passed through the circulating system were found.

Tests before the regeneration of the used pumice showed a weight increase of 8% due to the adsorbed impurities from the circulating system. A further test of the weight of the pumice after the regeneration showed that all impurities were removed therefrom.

135 regenerations of the adsorbent material were conducted. A weakening of the adsorptive capacity or a lessening of the mechanical strength of the pumice were not found.

The various features of novelty which characterize the invention are pointed out with particularity in the claims annexed hereto and forming a part of the specification.

What we claim is:

1. In a process for the removal of undesirable impurities from the gases circulating through the system for high pressure polymerization of ethylene or mixtures of ethylene with other polymerizable compounds at temperatures ranging from 10° C. to 80° C., and pressures between 50 and 800 atm., said removal being effected after separation of the high-molecular polymer formed, and before recirculation of said gases through the polymerization system, the step comprising passing said gases through a layer of porous material of the group consisting of generator slag, coke and pumice.

2. The process according to claim 1, wherein the porous material is in sintered form.

3. The process according to claim 1, wherein the porous material is in foamed form.

4. The process according to claim 1, wherein the porous material consists of granules having a size from 3–100 mm.

5. The process according to claim 4, wherein the materials used for passing said gases consist of granules having a size from 10–30 mm.

6. The process according to claim 1, in which the porous material is slag.

7. The process according to claim 1, in which the porous material is coke.

8. The process according to claim 1, in which the porous material is pumice.

References Cited

UNITED STATES PATENTS

| 1,872,080 | 8/1932 | Harris | 260—677 |
| 2,894,998 | 7/1959 | Hess et al. | 260—680 |

JAMES A. SEIDLECK, Primary Examiner

STANFORD M. LEVIN, Assistant Examiner

U.S. Cl. X.R.

260—96, 677, 88.2